United States Patent
Wang et al.

(10) Patent No.: US 6,821,448 B2
(45) Date of Patent: Nov. 23, 2004

(54) METHODS FOR PRODUCING THIN FILM MAGNETIC DEVICES HAVING INCREASED ORIENTATION RATIO

(75) Inventors: Jian Ping Wang, Singapore (SG); Lei Huang, Singapore (SG); Tow Chong Chong, Singapore (SG)

(73) Assignee: Data Storage Institute, Singapore (SG)

( * ) Notice: Subject to any disclaimer, the term of this patent is extended or adjusted under 35 U.S.C. 154(b) by 516 days.

(21) Appl. No.: 09/745,182

(22) Filed: Dec. 22, 2000

(65) Prior Publication Data

US 2002/0063108 A1 May 30, 2002

(30) Foreign Application Priority Data

Oct. 10, 2000 (SG) ...................................... 200005781-0

(51) Int. Cl.[7] ................................................. B44C 1/22
(52) U.S. Cl. .............................. 216/22; 216/58; 216/55
(58) Field of Search ............................ 216/22, 95, 58; 438/710, 720

(56) References Cited

U.S. PATENT DOCUMENTS 5,166,006 A    11/1992  Lal et al.
5,618,448 A  * 4/1997  Kuroe et al. ................... 216/97
5,748,421 A  * 5/1998  Taki et al. ..................... 360/135

FOREIGN PATENT DOCUMENTS

DE         41 32 565       4/1993
JP         07007003 A      1/1995

* cited by examiner

Primary Examiner—Robert Kunemund
Assistant Examiner—Binh X. Tran
(74) Attorney, Agent, or Firm—Nixon & Vanderhye P.C.

(57) ABSTRACT

A method of producing a thin film magnetic device comprising forming a thin film of magnetic material over a surface of a substrate having a controlled surface topography, wherein the surface of the substrate is first subject to isotropic etching so as to increase the capacity of the substrate surface to induce a high orientation ratio in a thin film of magnetic material formed over the substrate surface without a reduction in the smoothness of the substrate; and a method of modifying a thin film magnetic device comprising a thin film of a magnetic material, the method comprising the step of subjecting a surface of the thin film magnetic device having a controlled surface topology to isotropic etching so as to increase the orientation ratio of the thin film magnetic device without reducing the smoothness of the surface of the thin film magnetic device.

28 Claims, 3 Drawing Sheets

METHODS FOR PRODUCING THIN FILM MAGNETIC DEVICES HAVING INCREASED ORIENTATION RATIO

FIELD OF THE INVENTION

Background of the Invention

The present invention relates to a method for producing magnetic devices comprising a thin film of magnetic material, such as a magnetic recording thin film medium or other magnetic-related functional devices, having increased orientation ratio without a reduction in surface smoothness.

While magnetic recording media play a core role as an external memory device in computers, the requirements for recording capacity and recording density are increasing year by year.

High coercivity, small Mrt, good coercivity squareness, sufficient thermal stability and high orientation ratio (OR) are normally required for ultra high-density recording media. The orientation ratio is defined for magnetic media as a means to quantify the directional nature of the magnetic properties in the recording medium. The coercivity orientation ratio ($OR_{HC}$)—ratio of circumferential and radial coercivity on a circumferentially textured disk—is the most often cited. High OR film medium can give sharp transitions, and high signal output as well as low to medium noise. Furthermore, it has recently found that high orientation ratio (OR) can enhance the thermal stability of media.

With the latest developments in thin film media technology, orientation ratio has become an increasingly important factor. Reference is made to an article in J. Apply. Physics, Vol. 87, No. 8 entitled "Effect of magnetic anisotropy distribution in longitudinal thin film media".

Another key factor which influences the recording density of a magnetic recording medium is the so-called flying height of the magnetic head. The recording density of a magnetic recording medium is inversely proportional to the flying height of the magnetic head, via which the information is recorded onto and read and/or from the recording medium. The lower the flight height, the higher the writing field that is applied onto the media. Media with high coercivity can be used to get short transition and thus high density. Consequently, in designing computer disks, the flying height of the magnetic head should be reduced as much as possible, in order to increase the recording density. The surface of the disk substrate should be extremely smooth to permit a lower flying height.

However, extreme smoothness can result in a high contact area between the disk and the magnetic head which, in turn, can lead to a high degree of stiction and/or friction during the start up and the stopping of the disk. The high degree of stiction or friction can cause damage to the disk, the recording head and its accompanying assembly, as well as the disk drive motors. These problems counteract against the requirement for increased recording density by increasing the smoothness of the surface of the magnetic recording medium.

Usually, magnetic recording media have a magnetic film as thin as 10–20 nm so that the surface property of the media depends on the surface property of the substrate. To facilitate the retention of lubricant on the magnetic medium surface and thus lower the stiction and/or friction, a controlled surface topology, or the so-called "texture" substrate is often required. The texturing process is primarily a mechanical operation in which uniform, controlled scratches are cut into the polished surface of the substrate such as a nickel-phosphorous alloy coating. It is understood that the texturing of the substrate surface can decrease the true contacting area between the magnetic head and the disk. Furthermore, these scratches result in magnetic orientation along the scratches. Thus, the orientation ratio (OR) is closely associated with the substrate surface roughness induced by the texturing. This kind of circumferential texturing of the substrate can induce orientated magnetic properties in the circumferential direction.

The current texture process is usually accompanied by the formation of weldments and asperities along the texture lines. These weldments and asperities can result in an increase in the required flying height as well as severe wear on the magnetic layer during the operation of the disk. It is normally extremely difficult to obtain a good balance between the incompatible requirements for increased recording density and inducing high orientation ratio (OR) and medium tribology by virtue of the texturing process only.

SUMMARY OF THE INVENTION

It is an aim of the present invention to at least partially solve the above-identified problem.

According to a first aspect of the present invention, there is provided a method of producing a thin film magnetic device comprising forming a thin film of magnetic material over a surface of a substrate having a controlled surface topography, wherein the surface of the substrate is first subject to isotropic etching so as to increase the capacity of the substrate surface to induce a high orientation ratio in a thin film of magnetic material formed over the substrate surface without a reduction in the smoothness of the substrate.

According to a second aspect of the present invention, there is provided a method of increasing the capacity of a substrate to induce high orientation ratio (OR) in a thin film of magnetic material formed over a surface of the substrate without reducing the smoothness of the substrate, the method comprising the step of subjecting a surface of a substrate having a controlled surface topography to plasma etching so as to increase the capacity of the substrate surface to induce a high orientation ratio in a thin film of magnetic material formed over the substrate surface without reducing the smoothness of the substrate.

The isotropic etching is preferably such as to also increase the smoothness of the substrate surface and also increase the capacity of the substrate surface to induce coercivity in a thin film of magnetic material formed over the substrate surface.

The term isotropic etching refers to an etching process in which the vertical and horizontal removal of material proceed at substantially the same rate.

The substrate may comprise a substrate base having an upper surface, the upper surface of the substrate base being subjected to the isotropic etching. It may also comprise a substrate base and a seed layer formed on the substrate base, the surface of the seed layer opposite to the substrate base being subjected to the isotropic etching. Alternatively, it may comprise a substrate base, a seed layer formed on the substrate base, and an underlayer formed on a surface of the seed layer opposite the substrate base, the surface of the underlayer opposite the seed layer being subjected to the isotropic etching. According to another embodiment, the substrate comprises a substrate base, a seed layer formed on the substrate base, an underlayer formed on a surface of the seed layer opposite the substrate base, and an intermediate layer formed on a surface of the under layer opposite the seed layer, the surface of the intermediate layer opposite the under layer being subjected to the isotropic etching.

The substrate preferably comprises a coating of a nickel-phosphorous alloy or other suitable alloy on a base material selected from the group consisting of aluminium, an aluminium alloy, glass, ceramics, carbon, glass-ceramic, titanium and silicon, and wherein a surface of the coating opposite the base material is the substrate surface subject to isotropic etching.

According to a third aspect of the present invention, there is provided a method of modifying a thin film magnetic device comprising a thin film of a magnetic material, the method comprising the step of subjecting a surface of the thin film magnetic device having a controlled surface topology to isotropic etching so as to increase the orientation ratio of the thin film magnetic device without reducing the smoothness of the surface of the thin film magnetic device.

According to a fourth aspect of the present invention, there is provided a method of increasing the orientation ratio of a thin film magnetic device comprising a thin film of a magnetic material without reducing the smoothness of the surface of the thin film magnetic device, the method comprising the step of subjecting a surface of the thin film magnetic device having a controlled surface topology to isotropic etching so as to increase the orientation ratio of the thin film magnetic device without reducing the smoothness of the surface of the thin film magnetic device.

In one embodiment, the surface of the thin film of magnetic material is subject to the isotropic etching, whereas in another embodiment, a protective overcoat is formed over the thin film of magnetic material and a surface of the protective overcoat opposite the thin film of magnetic material is subject to the isotropic etching so as to increase the orientation ratio of the thin film of magnetic material without reducing the smoothness of the surface of the protective overcoat.

In each of the above aspects of the present invention, the isotropic etching is preferably carried out by RF sputtering etching, DC or AC plasma etching or reactive ion etching. The isotropic etching may be controlled with respect to an etching parameter selected from base pressure, gas composition, plasma power and etching time.

According to one embodiment, the controlled surface topology is a groove structure.

In a preferred embodiment, one or more of the seed layer, underlayer and intermediate layer, thin magnetic film and protective overcoat are formed by a deposition process, and the deposition process and the isotropic etching are carried out in a single vacuum system.

According to the method of the present invention, weldments and asperities produced in the texturing process are also reduced. The method of the present invention does not damage the original pattern of texture whereby the tribology requirements are fulfilled. Magnetic recording medium prepared using the method of the present invention have been found to have optimized texture morphology. A circumferential coercivity increase of about 1000 Oe, and an OR increase of from 1.2 to 2 have been achieved.

The isotropic etching can be performed in a sputtering apparatus, and it can be readily incorporated into the process of manufacturing magnetic recording media.

In a preferred embodiment of the present invention, a textured nickel-phosphorous (Ni—P) alloy layer plated on an Al—Mg substrate is subjected to RF sputtering etching, and a seedlayer, an underlayer, an intermediate layer, a magnetic layer and an overcoat are successively deposited on the etched surface of the substrate.

The magnetic recording medium produced by the method of the invention have a surface morphology roughness and energy that are determined by the textured substrate and the etching and deposition process. The morphology, roughness and energy of the textured surface can be controlled by adjusting base pressure, the gas composition, RF power and etching time during RF sputtering etching. An optimum modified surface of substrates created by plasma etching with an isotropic etch profile also provides increased flatness allowing a lower magnetic head flying height. The isotropic etching process is preferably controlled by adjusting etching pressure.

BRIEF DESCRIPTION OF THE DRAWINGS

Embodiments of the present invention are described hereunder, by way of example only, with reference to the accompanying drawings, in which.

DETAILED DESCRIPTION

Figure 1:
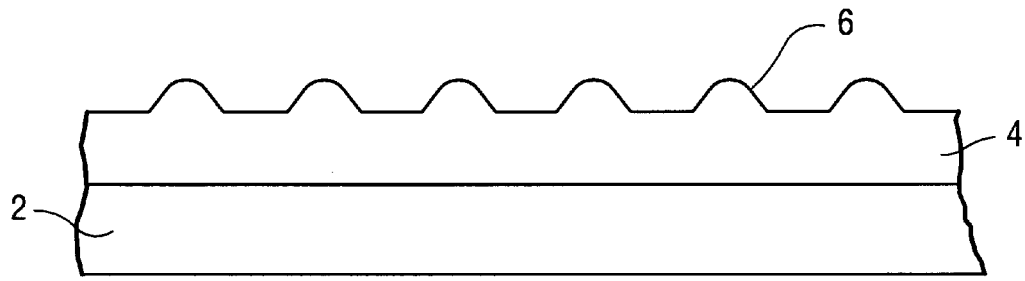
FIG. 1 is a schematic sectional view of an Al—Mg alloy substrate having a NiP textured surface with a hemi-spherical groove feature.

The substrate which is subject to isotropic etching is generally made of aluminum or its alloy or other materials that can be mechanically textured to form texture lines or patterns on it. A substrate made of an aluminum alloy is normally provided with a coating of a nickel-phosphorus alloy. The substrate is treated to have a controlled surface texture that includes roughness, waviness, lay and flaws. Substrates are textured, for example, by grinding such as with a rotary abrasive pad or by another appropriate method. Glass or ceramic substrates can be textured by similar methods after application of a metal sublayer, such as a Ti, or Nb, or Cr-alloy or NiP sub layer. FIG. 1 is a schematic sectional view of an Al—Mg alloy substrate 2 having a NiP textured layer 4 with a hemi-spherical waviness feature 6. According to an embodiment of the method of the present invention, the surface of the textured substrate described above is modified by plasma etching prior to the formation of the magnetic recording layer thereon.

Figure 2:
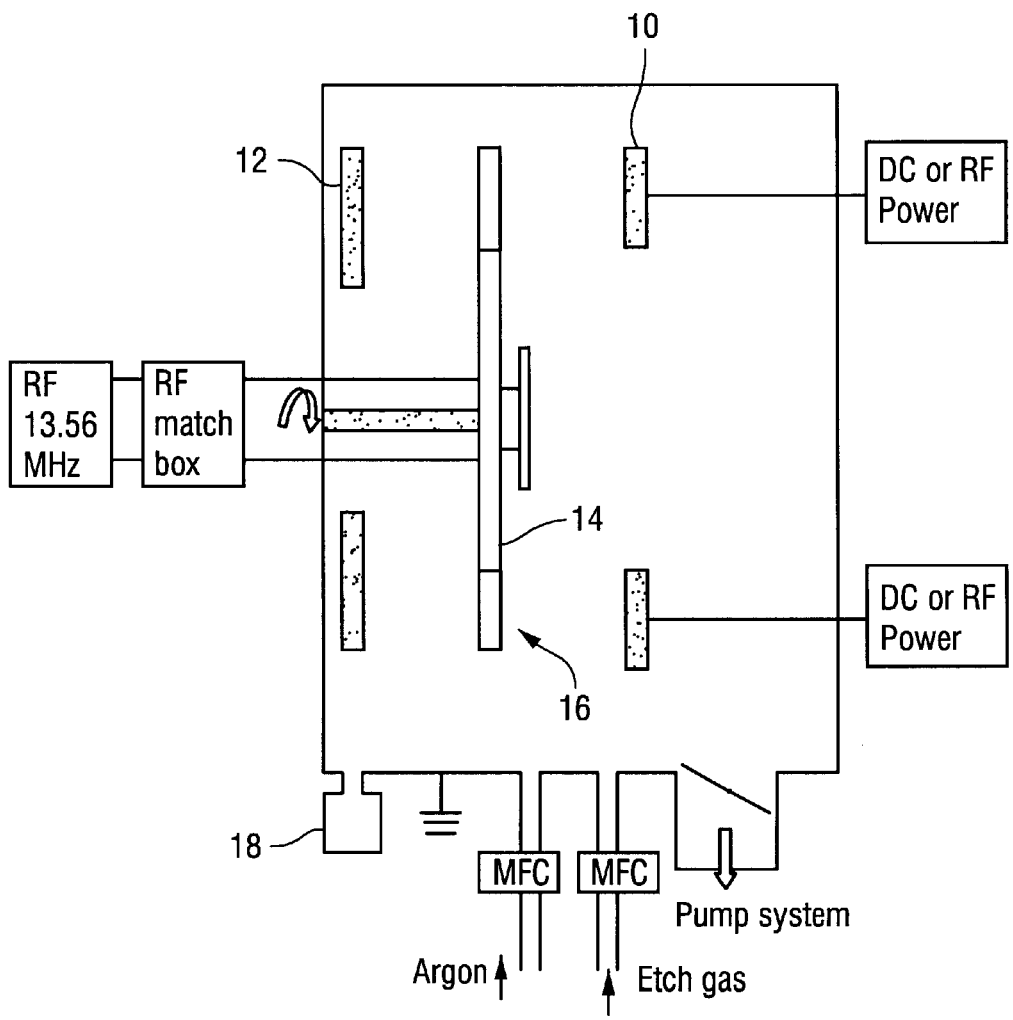
FIG. 2 is a diagram of an integrated plasma-etching and sputtering deposition chamber used for carrying out an embodiment of the method of the present invention.
Figure 3:
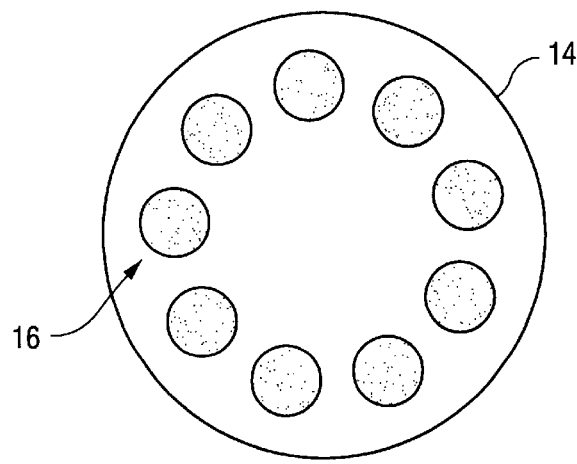
FIG. 3 is a schematic plan view of a plot of a substrate holder panel holding a number of textured substrates.

FIG. 2 schematically illustrates a plasma-etching chamber, which is also adapted for use as a sputtering chamber for deposition of one or more layers including the magnetic recording layers. The chamber includes four cathodes 10 (only two are shown) for producing the magnetic layers and two groups of infra-red lights 12 (only one group is shown) which are arranged for heating the substrate holder 14. A pressure gauge 18 is also provided. A plurality of textured substrates 16 are placed on the substrate holder 14 (shown in FIG. 3) which can be rotated for successively depositing all layers of the magnetic thin film recording medium in the chamber. The substrate holder 14 is connected with a RF power source through a RF matchbox. When the radio frequency power is applied with an adequately controlled gaseous atmosphere in the chamber, plasma is generated by which the surfaces of the textured substrates are modified by sputtering etching.

Figure 4:
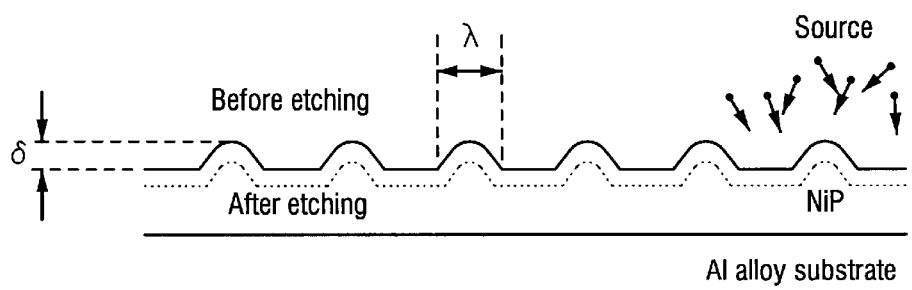
FIG. 4 is a schematic cross-sectional representation of isotropic etching of the textured substrate surface.

Isotropic etching is then carried out in which vertical and horizontal removal of material both proceed at the same rate resulting in a narrowing in the width of the texture lines. The profile of the textured substrate surface after isotropic etching is shown in FIG. 4 by the dotted line with the profile before etching shown by a solid line. Thus, isotropic plasma etching is effective at modifying the texture substrate surface. The orientation ratio (OR) is concerned with the scratch configuration of the texture substrate, i.e., the average depth of the texture line, $\delta$, and average width of the texture line, $\lambda$. The magnitude of OR increases with an increase in the texture parameter $\delta/\lambda$ of the substrate. Isotropic etching causes an increase in the $\delta/\lambda$ ratio of the texture line modification. Thus, a surface excellent in terms of both surface roughness (Ra) and magnetic performance ($H_c$ and OR) is obtained by isotropic etching.

Isotropic etching can be achieved by mainly controlling the etching pressure. According to the relationship between the mean free path and pressure, a high etching pressure is preferred.

The etching gas used for the sputtering etching in this embodiment is argon. It may however be mixed with other etching gases such as sulfur hexafluoride and carbon tetrafluoride. Although introducing the etching gases will result in different etching mechanisms, the textured substrate surface can still be modified as desired under the appropriate conditions. These gases can be introduced separately into the etching chamber each in a specified flow rate or can be introduced as a gaseous mixture in a specified mixing ratio.

Figure 5:
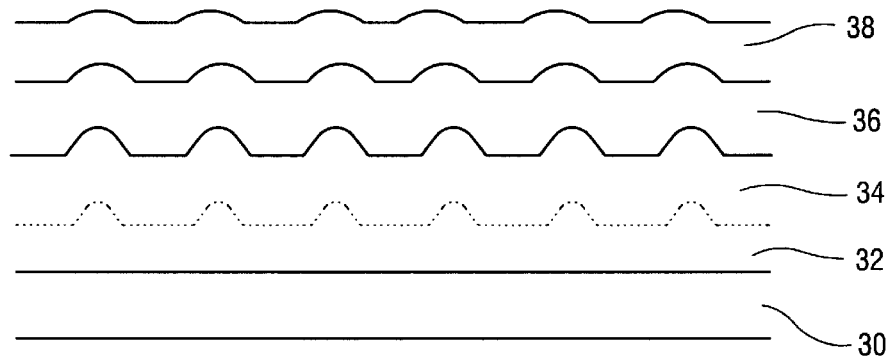
FIG. 5 is a schematic sectional view of a magnetic recording medium produced according to the method of the present invention.

Following the etching process, a plurality of layers such as a seedlayer, an underlayer, an intermediate layer, the magnetic layer and an overcoat are successively deposited on the etch-modified surface in the integrated chamber. An entire magnetic recording medium manufactured according to the method of the present invention is shown in FIG. 5 comprising an Al-alloy substrate 30, a nickel-phosphorous alloy layer 32 whose surface has been subject to plasma etching, a CrV underlayer 34, a CoCrTaPt magnetic recording layer 36 and a carbon protective overcoat 38. The magnetic disk medium described above thus has a surface roughness (Ra) that is a function of the manner by which the aforementioned process for controlling the size and shape of the texturing pattern is controlled by the deposition and etching process.

The following example in accordance with the present invention and comparative example illustrate the effect of the present invention. This example is in no way intended to limit the scope of the invention.

EXAMPLE 1

The RF etching and deposition of the underlayer, magnetic recording layer and protective overcoat as shown in FIG. 5 were carried out using an Innotec four-target sputter machine, as shown schematically in FIG. 2. Nickel-phosphorous plated aluminum substrates were circumferentially textured by mechanical texturing. The textured substrates were loaded into the integrated chamber and heated to 280° C. using quartz lamps. In order to compare the RF etching effect on the textured substrate, two samples were prepared: sample A without RF etching and direct deposition of the layers on the unetched surface (comparative example); sample B was etched for 30 seconds using a RF power of 500 W at a etching pressure of 25 mTorr, followed by deposition of the layers. The underlayer, magnetic recording layer, and protective overcoat were deposited using the same sputtering conditions for each sample. The conditions are detailed in Table 1.

TABLE 1

|  | CrV (underlayer) | CoCrTaPt (magnetic recording layer) | Carbon (protective overcoat) |
|---|---|---|---|
| DC Power | 1000 W | 400 W | 800 W |
| Sputter pressure | 7 mTorr | 7 mTorr | 3 mTorr* |
| Thickness | 30 nm | 20 nm | 10 nm |

*The working gas for depositing carbon was argon mixed with a little $C_2H_2$.

Figure 6:
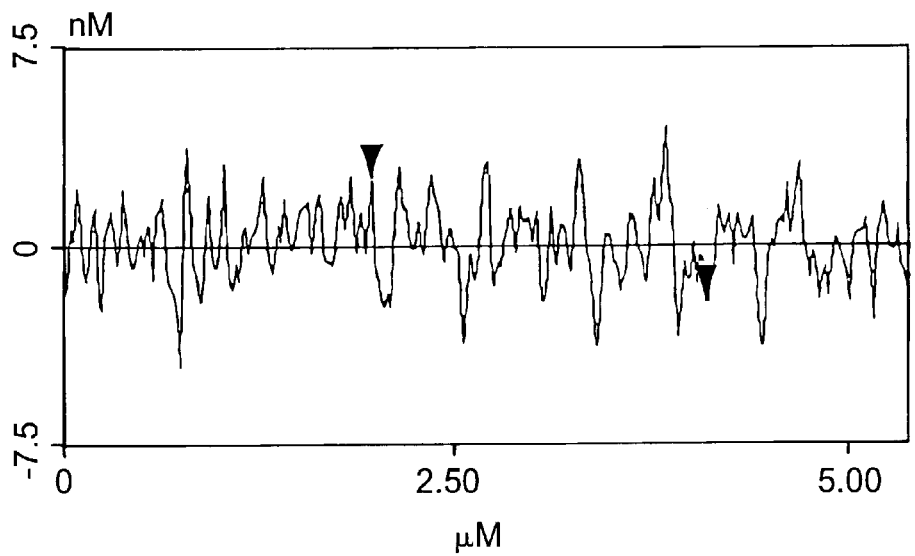
FIG. 6 is an AFM image with section analysis of a magnetic recording medium according to a comparative example.
Figure 7:
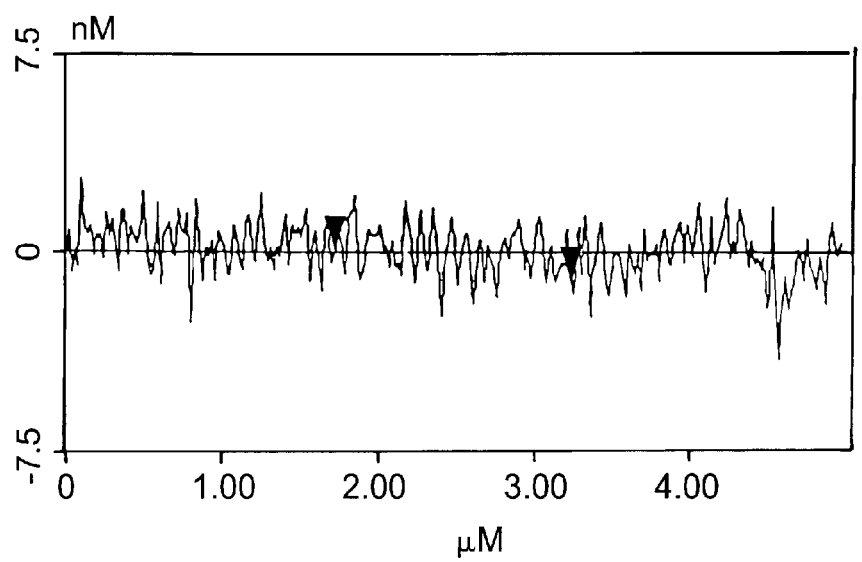
FIG. 7 is an AFM image with section analysis of a magnetic recording medium produced according to the method of the present invention.

FIG. 6 is an AFM image with section analysis of sample A (without etching), and FIG. 7 is an AFM image with section analysis of sample B with RF etching. Comparing with the two images, it is clear that the media surface roughness of Sample B is lower than that for sample A. The roughness data for each is listed in Table 2.

TABLE 2

| Sample A (without etching) | Sample B (with RF etching) |
|---|---|
| RMS: 1.72 nm | RMS: 1.10 nm |
| $R_a$: 1.26 nm | $R_a$: 1.02 nm |
| $R_{Max}$: 8.48 nm | $R_{Max}$: 3.50 nm |

In addition, from the section analysis, it is clear that the textures have become denser and that the average width of the texture line has become narrower after the RF etching process, resulting in an increased orientation ratio (OR). The magnetic properties of the two samples are summarily listed in Tables 3.1, 3.2 and 3.3.

TABLE 3.1

Coercivity in the circumferential direction $H_c$(cir.) and radial direction $H_c$(rad.) and coercivity orientation ratio.

|  | $H_c$(cir.) | $H_c$(rad.) | $OR_{HC}$ |
|---|---|---|---|
| Sample A (without etching) | 1176 Oe | 938 Oe | 1.25 |
| Sample B (RF etching) | 2229 Oe | 1224 Oe | 1.82 |

TABLE 3.2

Remanence in the circumferential direction Mr(cir.) and radial direction Mr(rad.) and remanence orientation ratio.

|  | $M_r$(cir.) | $M_r$(rad.) | $OR_{Mr}$ |
|---|---|---|---|
| Sample A (without etching) | 5.35E-4 emu. | 4.91E-4 emu. | 1.09 |
| Sample B (RF etching) | 932E-4 emu. | 5.89E-4 emu. | 1.58 |

TABLE 3.3

Coercive squareness in the circumferential direction S*(cir.) and radial direction S*(rad.) and coercive squareness orientation ratio.

|  | S* (cir.) | S* (rad.) | OR$_s$* |
| --- | --- | --- | --- |
| Sample A (without etching) | 0.81 | 0.70 | 1.16 |
| Sample B (RF etching) | 0.91 | 0.38 | 2.39 |

What is claimed is:

1. A method of producing a thin film magnetic device comprising forming a thin film of magnetic material over a surface of a substrate having a controlled surface topography, wherein the surface of the substrate is first subject to isotropic etching which increases a capacity of the substrate surface, relative to the substrate surface before isotropic etching, to induce a high orientation ratio in a thin film of magnetic material formed over the substrate surface, relative to the orientation ratio before isotropic etching, without a reduction in the smoothness of the substrate.

2. A method according to claim 1, wherein the isotropic etching increases the smoothness of the substrate surface.

3. A method according to claim 1, wherein the controlled surface topography is a groove structure.

4. A method according to claim 1, wherein the substrate comprises a substrate base having an upper surface, and the upper surface of the substrate base is subjected to the isotropic etching.

5. A method according to claim 1, wherein the isotropic etching is carried out by RF sputtering etching, DC or AC plasma etching or reactive ion etching.

6. A method according to claim 1, wherein the isotropic etching is controlled with respect to the etching pressure.

7. A method according to claim 1, wherein the isotropic etching is controlled with respect to an etching parameter selected from the group including base pressure, gas composition, plasma power and etching time.

8. A method according to claim 1, wherein the substrate comprises a coating of a nickel-phosphorous alloy on a base material selected from the group consisting of aluminium, an aluminium alloy, glass, ceramics, carbon, glass-ceramic, titanium and silicon, and wherein a surface of the coating opposite the base material is the substrate surface subject to isotropic etching.

9. A method according to claim 1, wherein the substrate comprises a substrate base and a seed layer formed on the substrate base, and the surface of the seed layer opposite to the substrate base is subjected to the isotropic etching.

10. A method according to claim 9, wherein the seed layer is formed by a deposition process, and wherein the deposition process and the isotropic etching are carried out in a single vacuum system.

11. A method according to claim 1, wherein the substrate comprises a substrate base, a seed layer formed on the substrate base, and an underlayer formed on a surface of the seed layer opposite the substrate base, and wherein a surface of the underlayer opposite the seed layer is subjected to the isotropic etching.

12. A method according to claim 11, wherein one or more of the seed layer and the underlayer are formed by a deposition process, and wherein the deposition process and the isotropic etching are carried out in a single vacuum system.

13. A method according to claim 1, wherein the substrate comprises a substrate base, a seed layer formed on the substrate base, an underlayer formed on a surface of the seed layer opposite the substrate base, and an intermediate layer formed on a surface of the under layer opposite the seed layer, and wherein a surface of the intermediate layer opposite the under layer is subjected to the isotropic etching.

14. A method according to claim 13, wherein one or more of the seed layer, underlayer and intermediate layer are formed by a deposition process, and wherein the deposition process and the isotropic etching are carried out in a single vacuum system.

15. A method of modifying a thin film magnetic device comprising a thin film of a magnetic material, the method comprising of subjecting a surface of the thin film magnetic device having a controlled surface topology to isotropic etching which increases the orientation ratio of the thin film magnetic device, relative to the orientation ratio before the isotropic etching, without reducing the smoothness of the surface of the thin film magnetic device.

16. A method according to claim 15, wherein the isotropic etching increases the smoothness of the thin film magnetic device.

17. A method according to claim 15, wherein the controlled surface topology is a groove structure.

18. A method according to claim 15, wherein the isotropic etching is carried out by RF sputtering etching, DC or AC plasma etching or reactive ion etching.

19. A method according to claim 15, wherein the isotropic etching is controlled with respect to the etching pressure.

20. A method according to claim 15, wherein the isotropic etching is controlled with respect to an etching parameter selected from the group including base pressure, gas composition, plasma power and etching time.

21. A method according to claim 15, wherein the surface of the thin film of magnetic material is subject to the isotropic etching.

22. A method according to claim 21, comprising forming the thin film of magnetic material on a substrate by a deposition process, and wherein the deposition process and the isotropic etching are carried out in a single vacuum system.

23. A method according to claim 15, wherein the thin film magnetic device comprises a protective overcoat formed over the thin film of magnetic material, and wherein a surface of the protective overcoat opposite the thin film of magnetic material is subject to the isotropic etching so as to increase the orientation ratio of the thin film of magnetic material, relative to the orientation ratio before the isotropic etching, without reducing the smoothness of the surface of the protective overcoat.

24. A method according to claim 23, comprising forming the protective overcoat on the thin film of magnetic material by a deposition process, and wherein the deposition process and the isotropic etching are carried out in a single vacuum system.

25. A method of increasing the capacity of a substrate to induce a high orientation ratio (OR) in a thin film of magnetic material formed over a surface of the substrate without reducing the smoothness of the substrate, the method comprising subjecting a surface of a substrate having a controlled surface topography to plasma etching so as to increase a capacity of the substrate surface to induce a high orientation ratio in a thin film of magnetic material formed over the substrate surface, relative to the capacity and orientation ratio before the plasma etching, without reducing the smoothness of the substrate.

26. A method according to claim 25, wherein the plasma etching increases the smoothness of the substrate surface.

27. A method of increasing the orientation ratio of a thin film magnetic device comprising a thin film of a magnetic material without reducing the smoothness of the surface of the thin film magnetic device, the method comprising subjecting a surface of the thin film magnetic device having a controlled surface topology to isotropic etching to increase the orientation ratio of the thin film magnetic device, relative to the orientation ratio before the isotropic etching, without reducing the smoothness of the surface of the thin film magnetic device.

28. A method according to claim 27, wherein the isotropic etching is such as to also increase the smoothness of the surface of the thin film magnetic device.

* * * * *